United States Patent
Robbins et al.

(10) Patent No.: US 9,792,250 B1
(45) Date of Patent: Oct. 17, 2017

(54) SYSTEM ON CHIP MODULE CONFIGURED FOR EVENT-DRIVEN ARCHITECTURE

(71) Applicant: Sandia Corporation, Albuquerque, NM (US)

(72) Inventors: Kevin Robbins, Albuquerque, NM (US); Charles E. Brady, Albuquerque, NM (US); Tad A. Ashlock, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 62 days.

(21) Appl. No.: 14/691,769

(22) Filed: Apr. 21, 2015

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 15/78 | (2006.01) |
| G06F 9/54 | (2006.01) |

(52) U.S. Cl.
CPC .......... *G06F 15/7821* (2013.01); *G06F 9/546* (2013.01)

(58) Field of Classification Search
CPC .................................................. G06F 15/7821
USPC ....................................................... 719/312
See application file for complete search history.

(56) References Cited

U.S. PATENT DOCUMENTS

| | | | |
|---|---|---|---|
| 8,079,009 B1 | 12/2011 | Sinclair | |
| 8,521,740 B2* | 8/2013 | Henderson | G06F 17/30893 707/737 |
| 8,555,032 B2 | 10/2013 | Snyder | |
| 8,736,303 B2 | 5/2014 | Snyder et al. | |
| 2003/0110306 A1 | 6/2003 | Bailis et al. | |
| 2004/0225992 A1 | 11/2004 | Sanchez et al. | |
| 2005/0183045 A1 | 8/2005 | Hwang et al. | |
| 2010/0125584 A1* | 5/2010 | Navas | G06F 17/30516 707/747 |
| 2012/0086050 A1 | 4/2012 | Bemanian et al. | |
| 2013/0091295 A1* | 4/2013 | Meijer | H04L 51/00 709/231 |
| 2013/0159595 A1 | 6/2013 | Zhou et al. | |
| 2014/0324959 A1* | 10/2014 | Hudson | H04L 47/623 709/203 |

* cited by examiner

*Primary Examiner* — Timothy A Mudrick
(74) *Attorney, Agent, or Firm* — Medley, Behrens & Lewis, LLC

(57) ABSTRACT

A system on chip (SoC) module is described herein, wherein the SoC modules comprise a processor subsystem and a hardware logic subsystem. The processor subsystem and hardware logic subsystem are in communication with one another, and transmit event messages between one another. The processor subsystem executes software actors, while the hardware logic subsystem includes hardware actors, the software actors and hardware actors conform to an event-driven architecture, such that the software actors receive and generate event messages and the hardware actors receive and generate event messages.

13 Claims, 6 Drawing Sheets

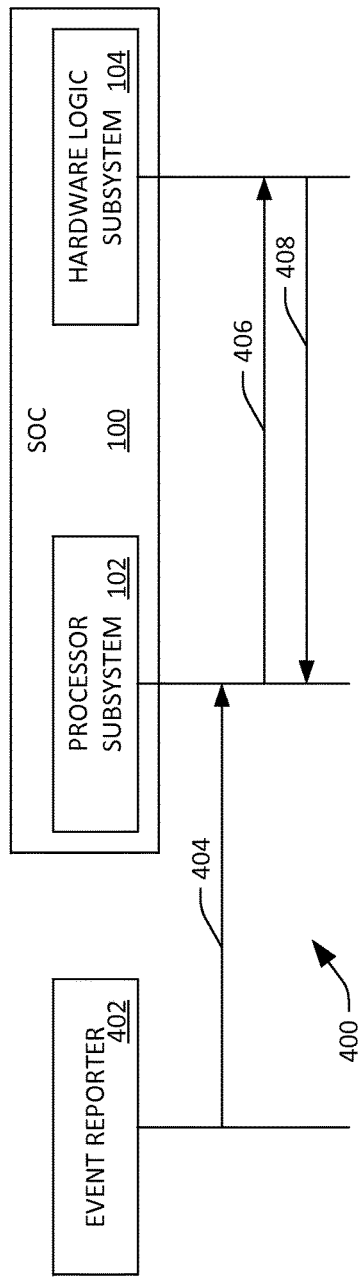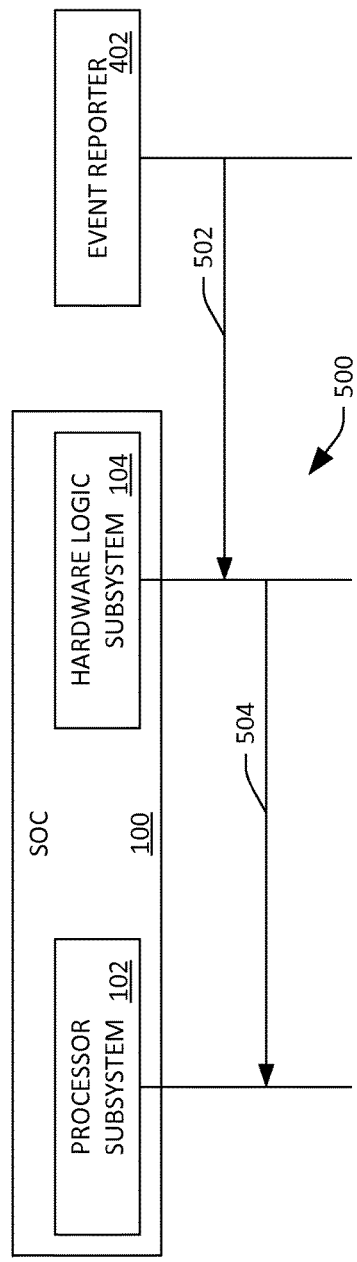

SYSTEM ON CHIP MODULE CONFIGURED FOR EVENT-DRIVEN ARCHITECTURE

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

A system on a chip (SoC) module is an integrated circuit (IC) that integrates relevant componentry of an electronic system into a single chip. The SoC module, therefore, may include digital, analog, mixed signal, and radio frequency circuitry on a common chip substrate. SoC modules are becoming increasingly popular in mobile electronics, due to relatively low power consumption typically associated with SoC modules (e.g., in comparison to conventional configurations, where the componentry referenced above are discrete and are coupled to one another).

In addition, SoC modules increasingly offer a compelling performance advantage over conventional processor/circuit configurations for many embedded applications, such as video processing. Moreover, SoC modules, as referenced above, allow for a single or multicore processor subsystem (e.g., a central processing unit (CPU)) to be paired with another kind of processing unit (e.g., a graphics processing unit (GPU), a hardware-based processing unit, etc.). Conventionally, however, different types of processing units are not configured to communicate with one another efficiently.

SUMMARY

The following is a brief summary of subject matter that is described in greater detail herein. This summary is not intended to be limiting as to the scope of the claims.

Described herein are various technologies pertaining to system on chip (SoC) modules. An exemplary SoC module includes a processor subsystem and a hardware logic subsystem, where the processor subsystem includes software actors (e.g., the processor subsystem includes a processor that executes instructions in memory), and where the hardware logic subsystem includes hardware actors (e.g., hardware logic elements). In an example, the processor subsystem can include a CPU and associated memory, and the hardware logic subsystem can be a field programmable gate array (FPGA) (e.g., FPGA logic fabric). The processor subsystem and hardware logic subsystem are in communication with one another. For example, the processor subsystem and the hardware logic subsystem can be in communication with one another by way of a shared memory pool, by way of a transmit/receive (TX/RX) queue, etc.

The processor subsystem includes, for example, a central processing unit (CPU) and memory (e.g. random access memory (RAM), Flash memory, etc.). The memory has a plurality of software actors stored therein, where the software actors are instructions that are executable by the CPU. For example, the memory can include an event broker component that is configured to broker event messages between software actors as well as between the processor subsystem and the hardware logic subsystem. Accordingly, the memory also includes at least one process that is configured to generate an output event message responsive to being triggered by an input event message, wherein the event broker component receives and brokers both the input event message and the output event message. Accordingly, the at least one process remains idle unless and until the event broker component identifies the input event message; the event broker component can then provide the input event message to the at least one process (or otherwise trigger execution of the at least one process). The at least one process then generates an output event message responsive to being triggered by the event broker component. The memory can include many software actor processes, each of which conforms to the event-driven architecture, wherein the event broker component is configured to trigger the appropriate software actor responsive to receiving and identifying event messages.

As mentioned above, the SoC module also includes the hardware logic subsystem, which is in communication with the processor subsystem. The hardware logic subsystem comprises event broker logic, which operates in a manner similar to the above-described operation of the event broker component. With more particularity, the event broker logic is configured to broker event messages between hardware logic modules in the hardware logic subsystem, and is further configured to broker event messages between the hardware logic subsystem and the processor subsystem. The hardware logic subsystem also includes an event bus, over which event messages are passed between the event broker logic and hardware logic modules.

Thus, the hardware logic subsystem includes at least one hardware logic module (e.g., one or more combinational logic blocks (CLBs)) that is configured to generate an output event message responsive to receiving an input event message. The hardware logic subsystem can include multiple hardware logic modules that are selectively triggered by the event broker logic responsive to the event broker logic receiving an input event message and directing the input event message to an appropriate hardware logic module.

Further, as noted above, the processor subsystem and hardware logic subsystem are in communication with one another. Accordingly, a software actor in the memory of the processor subsystem, when executed by the CPU, can output an event message that is to act as an input event message for a hardware logic module in the hardware logic subsystem. For example, the event broker component of the processor subsystem can receive the event message output by the above-mentioned software actor, and can cause the event message to be provided to the event broker logic of the hardware logic subsystem. The event broker logic of the hardware logic subsystem receives the event message, analyzes the event message, and then identifies the hardware logic module of the hardware logic subsystem that is to receive the event message as an input event message. The event broker logic then transmits the input event message to the appropriate hardware logic module by way of the event bus. The hardware logic module generates an output event message based upon the input event message, and transmits the output event message to the event broker logic over the event bus. The event broker logic analyzes the output event message, and directs such event message appropriately (e.g., to another hardware logic module and/or to the processor subsystem). Accordingly, events can be efficiently passed between software actors in the processor subsystem and hardware logic modules in the hardware logic subsystem.

Moreover, a hardware logic module of the hardware logic subsystem and a software actor in the memory of the processor subsystem can be configured to perform redundant functions. Ideally, then, the output (i.e., externally visible behavior) of the hardware logic module and the software actor is identical. This configuration may be particularly well-suited for applications where redundancy is desired (or required). Such a configuration may also be particularly beneficial for applications where performance optimization, in various contexts, is desired. For instance, the processor subsystem may perform better than the hardware logic module at temperatures at or above 17° C. When, however, the SoC module is subjected to temperatures below 17° C., the processor subsystem may perform unreliably, while the hardware logic subsystem remains reliable (although possibly slower). This built-in redundancy in an event-driven architecture allows for a "best" subsystem to be selected for generating an output event message based upon a received event message.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 4 and 5 illustrate exemplary communications flowing between an event reporter and a SoC module.

DETAILED DESCRIPTION

Figure 1:
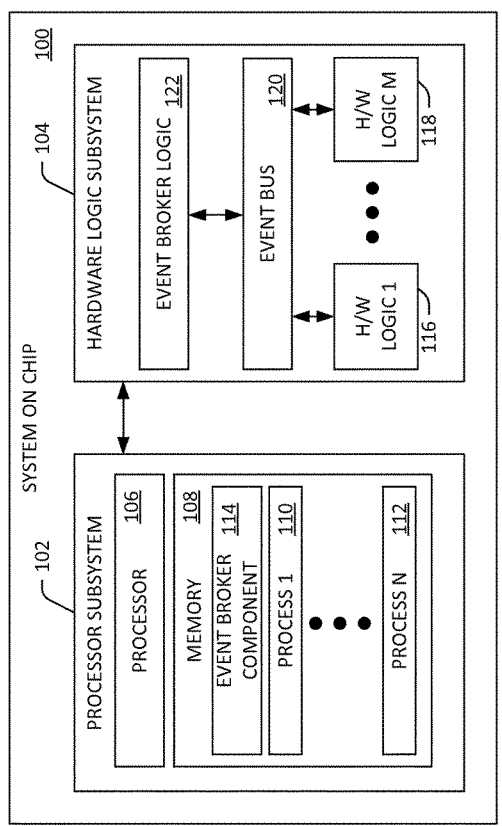
FIG. 1 illustrates an exemplary system on chip (SoC) module.

Various technologies pertaining to system on chip (SoC) modules are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "component" is intended to encompass computer-readable data storage that is configured with computer-executable instructions that cause certain functionality to be performed when executed by a processor. The computer-executable instructions may include a routine, a function, or the like. It is also to be understood that a component may be localized on a single device or distributed across several devices. Additionally, as used herein, the term "exemplary" is intended to mean serving as an illustration or example of something, and is not intended to indicate a preference.

With reference now to FIG. 1, an exemplary system on chip (SoC) module 100 is illustrated. The SOC modules 100 comprises a processor subsystem 102 and a hardware logic subsystem 104, wherein the processor subsystem 102 and the hardware logic subsystem 104 are integrated in the SoC module 100 (e.g., formed on a common base substrate). In an example, the hardware logic subsystem 104 can be or include field programmable gate array (FPGA) logic fabric. The processor subsystem 102 and the hardware logic subsystem 104 are in communication with one another, such that the processor subsystem 102 can transmit data to the hardware logic subsystem 104 and can receive data from the hardware logic subsystem 104. Similarly, the hardware logic subsystem 104 can transmit data to the processor subsystem 102 and can receive data from the processor subsystem 102. In a non-limiting example, the processor subsystem 102 and the hardware logic subsystem 104 can communicate with one another by way of a shared pool of memory (not shown), by way of a suitable transmit/receive queue, or other suitable element. As will be described in greater detail below, the processor subsystem 102 and the hardware logic subsystem 104 can each conform to an event-driven architecture, such that the processor subsystem 102 and the hardware logic subsystem 104 can exchange event messages between one another.

The processor subsystem 102 includes a processor 106 (e.g., a central processing unit (CPU)), and memory 108, wherein the memory 108 includes instructions that are executable by the processor 106. These instructions can include a plurality of processes 110-112 (which may be referred to as software actors) that can be executed by the processor 106, wherein the plurality of processes 110-112 conform to the event-driven architecture. Therefore, each process in the plurality of processes 110-112 pends until execution thereof is triggered by receipt of an appropriate event message. In an example, the first process 110 can be triggered (executed by the processor 106) responsive to the processor subsystem 102 receiving a first event message (an event message of a first type) from the hardware logic subsystem 104. The first process 110, when executed by the processor 106, can generate a second event message. Responsive to the first process 110 generating the second event message, the Nth process 112 may be triggered (executed by the processor 106), and can generate a third event message based upon the second event message. Moreover, in an example, processes in the processes 110-112 can communicate with one another (via event message exchange) by way of suitable inter-process communications.

Thus, for example, the first process 110 may output an event message that can be consumed by the Nth process 112.

The instructions in the memory 108 can also include an event broker component 114 that is executed by the processor 106, wherein the event broker component 114 is configured to broker event messages between the processor subsystem 102 and the hardware logic subsystem 104. The event broker component 114 is also configured to broker events between the processes 110-112. In a first example, the hardware logic subsystem 104 can output an event message that is received at the processor subsystem 102, wherein the event message is of a first type. The event broker component 114 can receive the event message, analyze the event message, and determine that a particular process in the processes 110-112 is to be triggered based upon the event message. The event broker component 114 can provide the event message to the particular process in the processes 110-112, which generates a second event message based upon the event message and provides the second event message to the event broker component 114. The event broker component 114 can receive the second event message, analyze the second event message, and determine that a second process in the processes 110-112 is to be triggered based upon the second event message. Thus, as noted above, the event broker component 114 can broker event messages between software actors of the processor subsystem. In another example, the event broker component 114 can receive an event message generated by the Nth process 112, analyze the event message, determine that the event message is to be provided to the hardware logic subsystem 104, and provide the event message to the hardware logic subsystem 104. Therefore, the event broker component 114 is further configured to broker event messages between the processor subsystem 102 and the hardware logic subsystem 104.

The hardware logic subsystem 104 comprises a plurality of hardware logic modules 116-118, wherein each of the hardware logic modules 116-118 conform to the event-driven architecture. Thus, each of the hardware logic modules 116-118 is configured to pend until an appropriate event message is received. In a non-limiting example, an event message may be received from an external entity (e.g., a sensor apparatus), the processor subsystem 102 (e.g., generated by one of the processes 110-112), or a hardware logic module in the hardware logic modules 116-118. Once a hardware logic module is triggered, the hardware logic module can output an event message.

The hardware logic subsystem 104 also include an event bus 120 over which event messages are transmitted to the hardware logic modules 116-118 or received from the hardware logic modules 116-118. The hardware logic subsystem 104 also includes event broker logic 122 that is configured to broker event messages between the hardware logic modules 116-118. In addition, the event broker logic 122 is configured to broker event messages between the hardware logic subsystem 104 and the processor subsystem 102. The event broker logic 122 can be implemented in software (e.g., the hardware logic subsystem 104 may include a microprocessor and corresponding memory, where the event broker logic 122 is included in the memory and executed by the microprocessor). In another example, the event broker logic 122 can be implemented in hardware, for example, as interconnected and programmed combinational logic blocks (CLBs). Similarly, the hardware logic modules 116-118 can each include one or more CLBs.

In a non-limiting example, the hardware logic subsystem 104 may receive an event message from an external event generator (e.g., a sensor apparatus) or the processor subsystem 102. The event broker logic 122 can analyze the event message and determine a hardware logic module that is to be triggered based upon the event message. The event broker logic 122 can then transmit the event message to the appropriate hardware logic module over the event bus 120. For example, the event broker logic 122 can determine that the hardware logic module 116 is to be triggered based upon a received event message, and can transmit the received event message to the hardware logic module 116. The hardware logic module 116 can generate an output event message based upon such event message, and provide the event broker logic 122 with the output event message over the event bus 120. The event broker logic 122 can analyze the output event message and determined that such event message is to trigger the Mth hardware logic module 118. The event broker logic 122 can then transmit the event message to the Mth hardware logic module 118, and the Mth hardware logic module 118 can generate a second output event message. The Mth hardware logic module 118 outputs the second output event message by way of the event bus 120, and the event broker logic 122 can receive and analyze this event message. The event broker logic 122 can determine that the second output event message is to be provided to the processor subsystem 102, and can transmit the event to the processor subsystem 102, where it is received and brokered by the event broker component 114.

The configuration shown in FIG. 1 has various advantages over conventional techniques. For example, the software actors (processes 110-112) and the hardware actors (hardware logic modules 116-118) can be functionally interchangeable (e.g., disregarding performance differences) because the actors only interact by exchanging events. For example, without regard to performance differences, the first process 110 executed by the processor 106 is unable to ascertain whether an event message that triggers the first process 110 has been generated by a software or hardware actor. Additionally, redundant functionality can be implemented across hardware and software. That is, software and hardware actors can be substituted for each other as needed to meet reliability or performance requirements for a particular context. That is, the process 110 can be configured to perform identical functionality as the hardware logic module 116 to meet reliability requirements for a particular application. Additionally, through appropriate design of processes and/or hardware logic modules, greater performance can be achieved by implementing functionality on the appropriate subsystem. For example, if a task requires some relatively simple parallelization, the functionality can be built into the hardware logic subsystem 104. Alternatively, software may be better suited for performing flexible sequential tasks, as well as tasks that require floating-point calculations.

Figure 2:
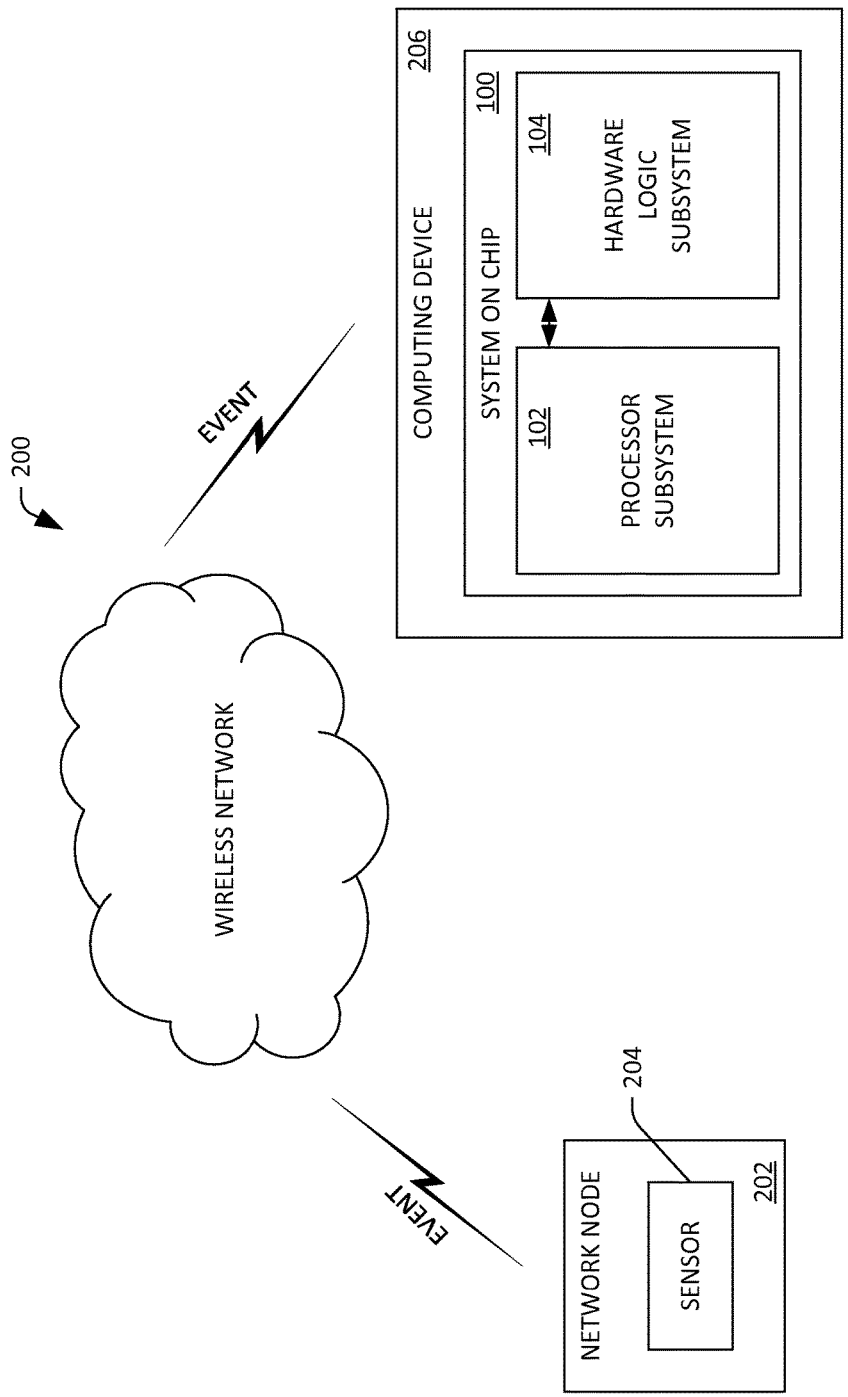
FIG. 2 is a functional block diagram of an exemplary network that includes a computing device that comprises a SoC module.

With reference now to FIG. 2, an exemplary wireless network 200 is illustrated. For example, the wireless network 200 may be a wireless multicast network. The wireless network 200 includes a network node 202, which can comprise a sensor 204. For example, the network node 202 can be a computing device that includes or is in communication with the sensor 204. The wireless network 200 also comprises a computing device 206 that includes the SoC module 100. For example, the computing device 206 may be a mobile computing device, such as a mobile telephone, a mobile media device or other suitable mobile device. As described above, the SoC module 100 includes the processor subsystem 102 and the hardware logic subsystem 104.

Additionally, while not shown, the SoC module 100 can include a wireless network interface card (NIC) that is included in or in communication with the processor subsystem 102 (or the hardware logic subsystem 104). In a non-limiting example, the sensor 204 can be configured to monitor a door, and the network node 202 can publish an event message over the wireless network 200 that indicates that the door has been opened. The event message, for instance, may include an event type and other data, such as a unique identity of the door. The processor subsystem 102 can receive the event message from the NIC referenced above. The event message is provided to the event broker component 114, which, based upon the type of the event message and other data in the event message, can identify where the event message is to be directed. For instance, the event broker component 114 can analyze the event message and determine that the event message is to trigger the first process 110, and is also to be provided to the hardware logic subsystem 104. The first process 110, responsive to receipt of the event message from the event broker component 114, can generate a second event message, which is to be transmitted to an operator station in communication with the computing device 206 by way of the wireless network 200. This second event message may cause a notification to be presented to an operator of the operator station, where the notification indicates to the operator that the door has been opened.

Additionally, as noted above, the event broker component 114 can determine that the event message is to be transmitted to the hardware logic module 104 (e.g., by way of a shared memory pool, a communications bus, etc.). The event broker logic 122 receives the event message and determines that the first hardware logic module 116 is to be triggered based upon the event message. The event broker logic 122 transmits the event message to the first hardware logic module 116 by way of the event bus 120. The first hardware logic module 116, responsive to receiving the event message, can output a third event message. For instance, the function of the first hardware logic module may be to generate event messages for transmittal to another network node in the wireless network 200, wherein such event messages cause an alarm to be generated.

FIG. 2 has generally been set forth to illustrate that the SoC module 100 is well-suited for use in a wireless network, where event messages are being passed amongst computing devices and between the processor subsystem 102 and the hardware logic subsystem 104.

Figure 3:
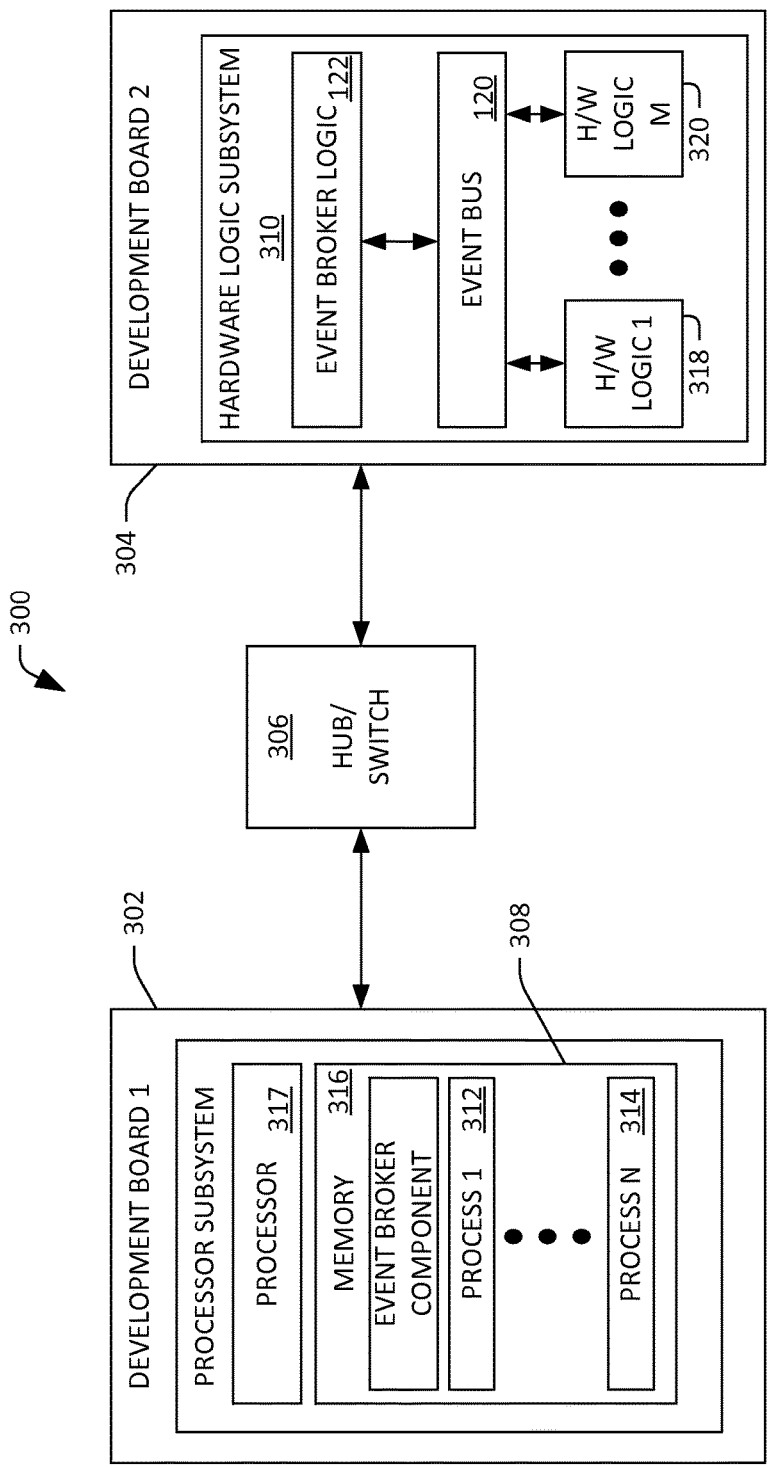
FIG. 3 illustrates an exemplary system that facilitates development of functionality to be performed on a processor subsystem and a hardware logic subsystem in a SoC module prior to the processor subsystem and hardware logic subsystem being integrated in the SoC module.

Turning now to FIG. 3, a system 300 that facilitates developing software and hardware actors for inclusion in the SoC module 100 is illustrated. The system 300 can include a first development board 302 and a second development board 304, which are in communication with one another by way of a hub and/or switch 306. The first development board 302 can include a processor subsystem 308, and the second development board 304 can include a hardware logic subsystem 310. A designer can program software actors (processes 312-314) in memory 316 of the processor subsystem 304, wherein such processes 312-314 are executable by a processor 317 in the processor subsystem 308.

Likewise, in an example, the designer can interconnect CLBs to form hardware logic modules 318-320 of the hardware logic subsystem 310. The designer may then test the software and hardware actors as well as operation of the event broker component 114 and the event broker logic 122 (to test interoperability of the processor subsystem 308 and the hardware logic subsystem 310). The system 300 thus addresses a known difficulty in SoC module development: the ability to appropriately test functionality prior to committing to a design. For example, when functionality of different types is implemented in a SoC module across different subsystems, it may become difficult to identify a defect. For instance, the designer, when analyzing a SoC module, is unable to apply an oscilloscope to a pin of interest, because such pin does not exist on the SoC module; rather, the pin may be integrated in the IC of the SoC module. Likewise, in a SoC module, a designer may be unable to probe a memory bus between memory and CPU. In the exemplary system 300, however, as the processes 312-314 and the hardware logic modules 318-320 are both event-driven, during design/development, functionality can be implemented and tested on the discrete development boards 302 and 304, and the processor subsystem 308 and the hardware logic subsystem 310 can communicate by way of the hub and/or switch 306. Thus, network traffic passing between the processor subsystem 308 and the hardware logic subsystem 310 can be captured and analyzed for correctness prior to constructing the SoC module 100 (FIG. 1).

Now referring to FIG. 4, an exemplary communications diagram 400 that illustrates an exemplary communications flow between an event reporter 402, the processor subsystem 102, and the hardware logic module 104 is illustrated. The event reporter 402 may be a sensor or computing device that is configured to generate an event message responsive to occurrence of some predefined event. In another example, the event reporter 402 may be embedded in a printed circuit board (PCB) upon which the SoC module 400 is affixed.

At 404, the event reporter 402 generates a first event message. The event message is received at the processor subsystem 102 of the SoC module 100 (e.g., from a NIC). The event message is analyzed by the event broker component 114, which determines that a software actor (e.g., the first process 110 in the processes 110-112) is to be provided with the event message, and further determines that the event message is to be provided to the hardware logic module 104. The first process 110 can be executed by the processor 106 based upon the event message output by the event reporter 402, wherein the first process 110 generates a second event message when executed.

At 406, the (first) event message is provided to the hardware logic subsystem 104. The event broker logic 122 receives the event message and identifies that the event message triggers, for instance, the first hardware logic module 116. In an example, the first process 110 and the first hardware logic module 116 can be configured to be redundant, in that they perform the same functionality (e.g., for resiliency, flexibility, performance, or reliability requirements).

The event broker logic 122 can provide the first event message to the first hardware logic module 116. The first hardware logic module 116, responsive to receiving the first event message, can generate a third event message based upon the first event message received from the event broker logic 122. The first hardware logic module 116 outputs the third event message to the event broker logic 122 over the event bus 120. The event broker logic 122 can analyze the third event message and determine that the third event message is to be provided to the processor subsystem 102.

At 408, the event broker logic 122 provides the third event message to the processor subsystem 102. The memory 108 may include instructions that are configured to compare the second event message (generated by the first process 110) with the third event message (generated by the first hardware logic module 116). When the second event message and the third event message are determined to compare appropriately (e.g., be equivalent or have an equivalent payload), the processor subsystem 102 may take a first action. When the second event message and the third event message do not compare appropriately (e.g., the event messages are not equivalent or do not have equivalent payloads), the processor subsystem 102 can be configured to take a second action. The communications diagram 400 has been set forth to illustrate an example where the processor subsystem 102 receives an initial event message, and to further illustrate event messages being passed between the processor subsystem 102 and the hardware logic subsystem 104. The communications diagram 400 has also been set forth to illustrate an example where a software process and a hardware logic module are configured to perform redundant functionality.

Now referring to FIG. 5, another exemplary communications diagram 500 illustrating communications between the event reporter 402, the hardware logic subsystem 104, and the processor subsystem 102 is illustrated. In this example, the event reporter 402 may be a hardware sensor on a PCB upon which the SoC module 100 is affixed. At 502, the event reporter 402 can output a signal that is indicative of a temperature, and the SoC module 100 can be configured to sample the temperature signal at a suitable rate. Each sample may then be put across a suitable interface. The Mth hardware logic module 118 of the hardware logic subsystem 104 can be coupled to the aforementioned interface, and can generate an event message for each sampled signal. That is, the Mth hardware logic module 118 can construct an event message and publish the event message over the event bus 120. The event broker logic 122 analyzes the event message and determines that such event message is to be provided to the first hardware logic module 116, and further determines that the event message is to be provided to the processor subsystem 102. The first hardware logic module 116 can receive the event message, and is configured to perform some functionality with respect to the event message. This functionality, for example, may be to compute an average temperature over some time (e.g., the last 5 minutes) and compare the average temperature to a threshold. The first hardware logic module 116 can output an appropriate event message depending upon whether the average temperature for the last 5 minutes is above or below the threshold.

At 504, the event message output by the Mth hardware logic module 118 is provided to the processor subsystem 102 by the event broker logic 122. The event broker component 114 receives the event message and determines that the Nth process 112 is to be triggered based upon the event message. The Nth process 112 can be configured to compare each temperature reading with a threshold and output an appropriate event message based upon the comparison. For instance, when the temperature reading is above the threshold, the Nth process 112 can be configured to generate a new event message for transmittal to an operator to inform the operator that the temperature is too high.

The communications diagram 500 of FIG. 5 has been set forth to illustrate that the hardware logic subsystem 104 can initially receive an event output by the event reporter 402 and can transmit one or more event messages to the processor subsystem 102 based upon functionality performed by one or more of the hardware logic modules 116-118.

Figure 6:
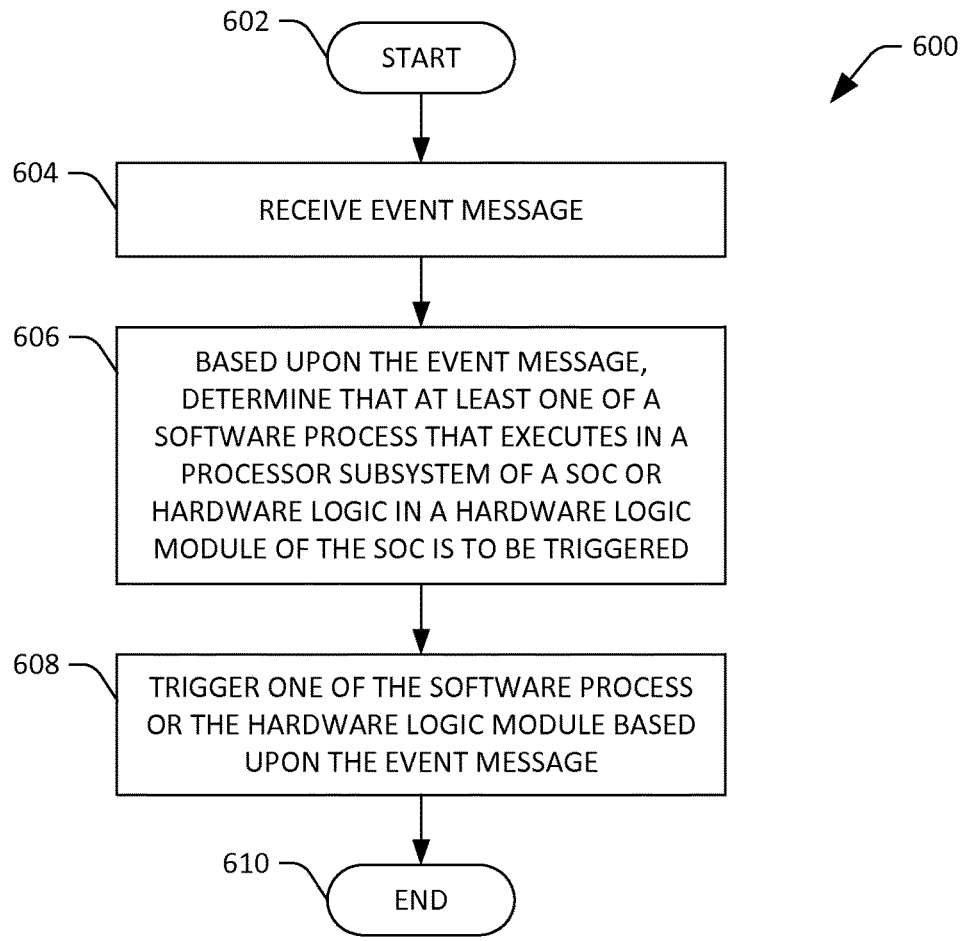
FIG. 6 is a flow diagram that illustrates an exemplary methodology for selectively triggering one of a software actor or a hardware actor responsive to receipt of an event message.
Figure 7:
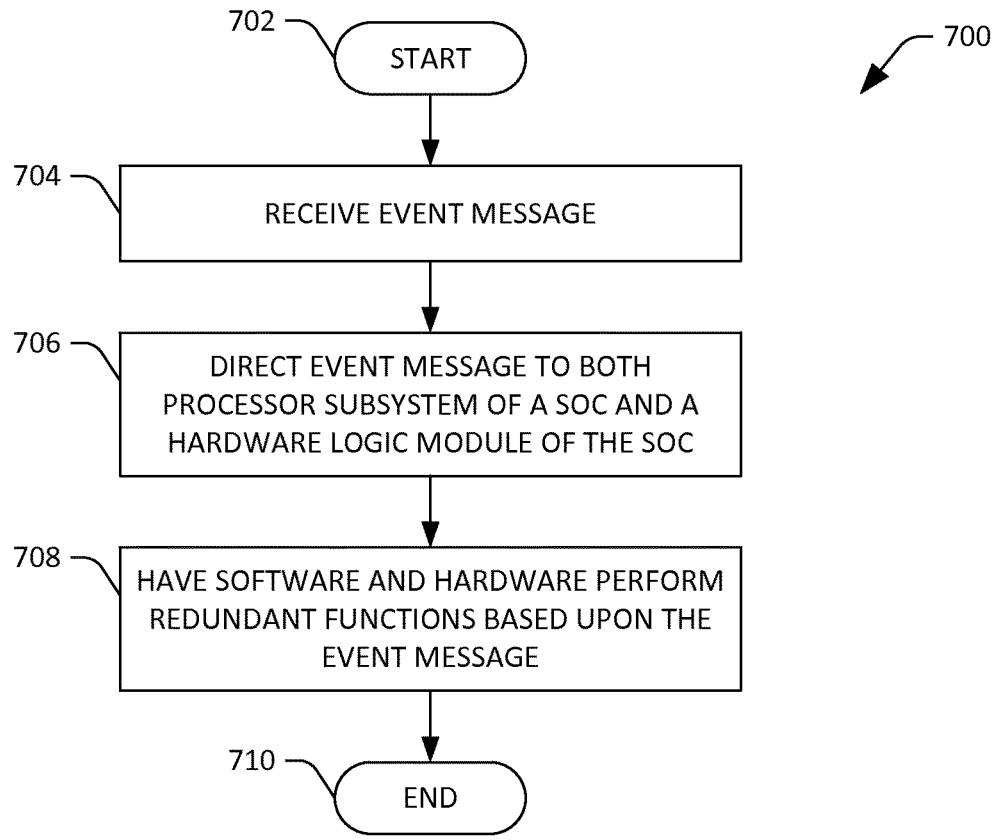
FIG. 7 is a flow diagram that illustrates an exemplary methodology for performing a redundant function responsive to receipt of an event message.

FIGS. 6-7 illustrate exemplary methodologies relating to event message generation and transmittal in a SoC module. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 6, an exemplary methodology 600 that facilitates executing at least one of a software process or triggering a hardware logic module is illustrated. The methodology 600 starts at 602, and at 604, an event message is received. The event message is of a particular type and can include data that is indicative of parameters of an event that triggers the event message. At 606, based upon the event message, a determination is made regarding whether a software process that executes in a processor subsystem of a SoC module or a hardware logic module in a hardware logic subsystem of the SOC module is to be triggered. For example, this determination can be performed by the event broker component 114 or the event broker logic 122.

At 608, responsive to the determination at 606, one of the software process or the hardware logic module is triggered. For example, the software process can be executed by a processor. Alternatively, the hardware logic module can be provided with a signal that causes the hardware logic module to generate an output. The methodology 600 completes at 610.

Now referring to FIG. 7, an exemplary methodology 700 for redundantly performing a function in both software and hardware on a SoC module is illustrated. The methodology 700 starts at 702, and at 704, an event message is received. At 706, the event message is directed to both a processor subsystem of a SoC module and a hardware logic subsystem of the SoC module. For example, the act of directing can be performed by the event broker component 114 of the processor subsystem or the event broker logic 122 of the hardware logic subsystem. At 708, software and hardware are caused to perform redundant functions based upon the event message. As described above, a process in the processes 110-112 can perform a function and a hardware logic module in the hardware logic modules can perform a function, wherein such functions are redundant. The methodology 700 completes at 710.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:
1. A computing device comprising:
   a system on chip (SoC) module, the SoC module comprises:

a processor subsystem, the processor subsystem comprises:
  a processor; and
  memory that comprises:
    an event broker component that is executed by the processor, the event broker component configured to detect receipt of a predefined event message at the processor subsystem; and
    a process that conforms to an event-driven architecture, wherein the event broker component is further configured to cause the processor to execute the process responsive to the event broker component detecting receipt of the predefined event message at the processor subsystem, the process configured to cause the processor to generate an output event message responsive to the processor executing the process; and
a hardware logic subsystem, the hardware logic subsystem comprises:
  event broker logic that is configured to detect receipt of a predefined second event message at the hardware logic subsystem; and
  a hardware logic module that conforms to the event-driven architecture, wherein the event broker logic is further configured to trigger operation of the hardware logic module responsive to the event broker logic detecting receipt of the predefined second event message, the hardware logic module configured to generate a second output event message responsive to being triggered;
wherein the processor subsystem and the hardware logic subsystem are configured to communicate with one another.

2. The computing device of claim 1, further comprising a shared memory pool, where the processor subsystem and the hardware logic subsystem are configured to communicate with one another by way of the shared memory pool.

3. The computing device of claim 1, further comprising a communications bus, where the processor subsystem and the hardware logic subsystem are configured to communicate with one another by way of the communications bus.

4. The computing device of claim 1, the output event message is the predefined second event message, and wherein the event broker component is configured to receive the predefined second event message and direct the predefined second event message to the hardware logic subsystem.

5. The computing device of claim 1, the second output event message is the predefined event message, and wherein the event broker logic is configured to receive the predefined event message and direct the predefined event message to the processor subsystem.

6. The computing device of claim 1, the event broker component is further configured to receive a third predefined event message, determine that the third predefined event message is to be provided to the hardware logic subsystem, and cause the third predefined event message to be directed to the event broker logic of the hardware logic subsystem.

7. The computing device of claim 6, the memory comprising a second process that conforms to the event-driven architecture, the event broker component is further configured to cause the processor to execute the second process responsive to the event broker component receiving the third predefined event message, the second process configured to cause the processor to generate a third output event message responsive to the processor executing the second process.

8. The computing device of claim 7, the hardware logic subsystem comprising a second hardware logic module that conforms to the event-driven architecture, the event broker logic configured to receive the third predefined event message and trigger the second hardware logic module responsive to the event broker logic receiving the third predefined event message, the second hardware logic module configured to generate the third output event message when triggered.

9. The computing device of claim 1, the event broker logic is further configured to receive a third predefined event message, determine that the third predefined event message is to be provided to the processor subsystem, and cause the third predefined event message to be directed to the event broker component of the processor subsystem.

10. The computing device of claim 9, the memory comprising a second process that conforms to the event-driven architecture, the event broker component is further configured to cause the processor to execute the second process responsive to the event broker component receiving the third predefined event message, the processor is configured to perform certain functionality responsive to executing the second process.

11. The computing device of claim 10, the hardware logic subsystem comprising a second hardware logic module that conforms to the event-driven architecture, the event broker logic configured to cause the second hardware logic module to execute responsive to the event broker logic receiving the third predefined event message, the second hardware logic module configured to perform the certain functionality.

12. A System on Chip (SoC) module comprising:
  a processor subsystem; and
  a field programmable gate array (FPGA) fabric that is in communication with the processor subsystem, the processor subsystem and the FPGA fabric configured with event-driven functionality, the processor subsystem configured to generate first event messages and cause the first event messages to be accessible to the FPGA fabric, the FPGA fabric configured to generate second event messages and cause the second event messages to be accessible to the processor subsystem.

13. The computing device of claim 1, wherein the hardware logic subsystem is a field programmable gate array (FPGA) fabric.

* * * * *